United States Patent [19]

Morgavi

[11] Patent Number: 5,536,328
[45] Date of Patent: Jul. 16, 1996

[54] CLEANING CARD FOR PRINTING MACHINE AND FOR A WORK STATION FOR THE ELECTRICAL CUSTOMIZATION OF THE CARDS

[75] Inventor: Paul Morgavi, La Ciotat, France

[73] Assignee: Gemplus Card International, Gemenos, France

[21] Appl. No.: 420,090

[22] Filed: Apr. 11, 1995

[30] Foreign Application Priority Data

Apr. 15, 1994 [FR] France ................................ 94 04831

[51] Int. Cl.$^6$ ............................................. B08B 7/00
[52] U.S. Cl. ........................... 134/6; 15/118; 15/210.1; 15/104.002; 15/105; 101/423
[58] Field of Search .............................. 101/423, 424, 101/424.1; 400/702, 701; 15/104.93, 105, 104.002, 210.1, 209.1, 118; 451/526, 527, 529; 134/6, 9, 15

[56] References Cited

U.S. PATENT DOCUMENTS

| | | | |
|---|---|---|---|
| 3,029,457 | 4/1962 | Hunder et al. | 400/702 |
| 3,069,815 | 12/1962 | Valentine | 15/210.1 |
| 3,822,517 | 7/1974 | Moss | 15/118 |
| 4,349,933 | 9/1982 | Thompson | 15/210.1 |
| 4,627,643 | 12/1986 | Leonetti et al. | 451/539 |
| 4,933,015 | 6/1990 | White | 400/702 |
| 5,140,785 | 8/1992 | Eleouet | 15/210.1 |
| 5,148,572 | 9/1992 | Wells et al. | 15/118 |
| 5,227,844 | 7/1993 | Bhattacharjee et al. | 15/104.93 |
| 5,408,718 | 4/1995 | Sadovsky | 15/118 |

FOREIGN PATENT DOCUMENTS

| | | |
|---|---|---|
| A-0379959 | 8/1990 | European Pat. Off. . |
| A-1961899 | 8/1971 | Germany . |
| 0070440 | 3/1990 | Japan ................................ 400/701 |

OTHER PUBLICATIONS

Patent Abstracts of Japan, vol. 15, No. 169, Apr. 1991; JP 3034112, Feb. 1991.
Patent Abstracts of Japan, vol. 13, No. 577, Dec. 1989; JP1242278, Sep. 1989.

Primary Examiner—Edgar S. Burr
Assistant Examiner—Anthony H. Nguyen
Attorney, Agent, or Firm—Nilles & Nilles

[57] ABSTRACT

A cleaning card for a card-printing machine associated with a station for the electrical customization of the cards. The cleaning card has dimensions substantially identical to those of the cards to be printed, and is coated with two cleaning flat pads. The first cleaning flat pad, on both sides of the card, collects and retains various types of dust and dirt. The second cleaning flat pad, on the face designed to receive the electrical customization at the locations defined by the standards, is adapted to the cleaning of the landing contacts.

14 Claims, 1 Drawing Sheet

CLEANING CARD FOR PRINTING MACHINE AND FOR A WORK STATION FOR THE ELECTRICAL CUSTOMIZATION OF THE CARDS

BACKGROUND OF THE INVENTION

1. Field of the Invention

The present invention relates to a cleaning card for a card printer working by thermal transfer, provided with a work station at which the cards are electrically customized.

2. Description of the Prior Art

There are known card-printing machines, notably for plastic cards, implementing the technology of thermal transfer in which the primary color inks, deposited on a plastic ribbon, are successively fixed to the printing medium by a thermal printer head.

These card printers, for black-and-white or color printing, with printing either on the card-face alone or on both card-face and card-back, after turning over the card or simultaneously on both faces, have been described in French patent applications filed by the present Applicant.

In these machines, the card to be printed, which is generally in accordance with the ISO 7816-2 standard, is always supplied, conveyed, turned over if necessary, transferred from one station to another by a set of drive rollers that push or pull the card beneath the thermal printer head or heads, as well as inside the device for the electrical customization of the cards. This electrical customization consists of a marking, which is electrical or magnetic, by means of a landing contact, at locations defined by AFNOR and ISO standards.

The operation of these machines for the printing and electrical customizing of the cards causes a movement of dust attracted by the phenomenon of static electricity prompted by friction between the plastic cards, the plastic ribbon and various rollers.

The technology of thermal transfer may also prompt deposits of ink spots on the cards, particularly when there is clinging between the card and the ribbon which are softened by a rise in temperature, said spots soiling the various external and internal conveying rollers.

The landing contacts of the electrical customization station also tend to get soiled since the card-marking regions are also subjected to dust attracted by the static electricity of the friction and are vulnerable to ink spots. This soiling may result in poor contacts and may even insulate the position to be marked electrically.

SUMMARY OF THE INVENTION

To overcome these drawbacks, the invention is aimed at carrying out the cleaning of a printing machine by means of a special card provided with two cleaning elements.

An object of the invention, therefore, is a cleaning card for a card-printing machine working by thermal transfer, associated with an electrical customization device, wherein the cleaning card comprises:

a first cleaning means that is fixed to all or a part of at least one of the two faces of a card body, and a second cleaning means that is fixed to at least one face of the card body, at the location of the regions designed for the electrical customization of the card to be printed.

BRIEF DESCRIPTION OF THE DRAWINGS

Other features and advantages of the present invention shall appear from the following description of a particular example of the invention, said description being made with reference to the appended drawing in which.

MORE DETAILED DESCRIPTION

Figure 1:
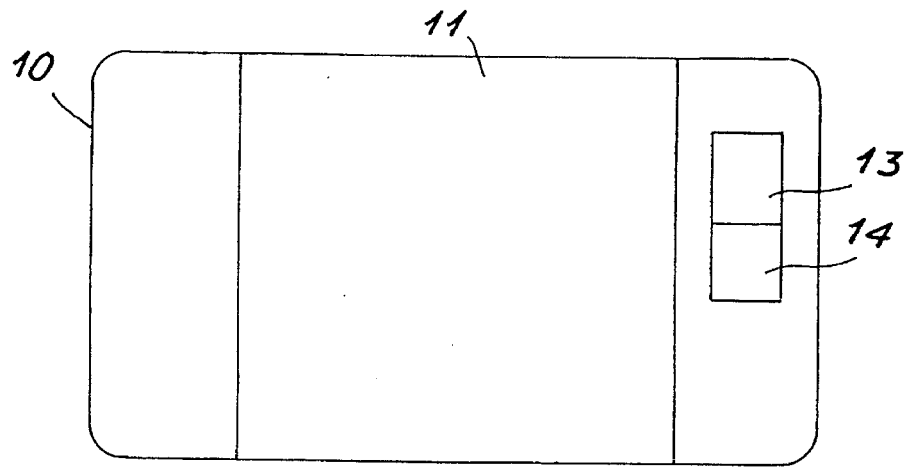
FIG. 1 is a front view of a face of the cleaning card, on the side with the locations of the electrical or magnetic marking.
Figure 2:
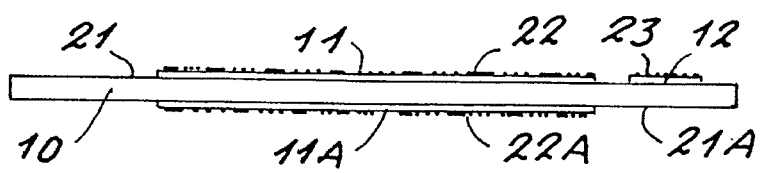
FIG. 2 is a longitudinal sectional view of the cleaning card.
Figure 3:
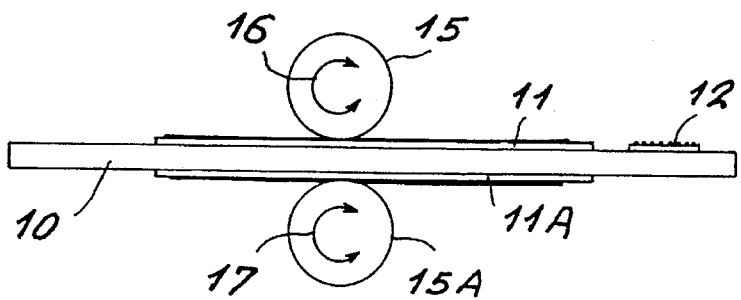
FIG. 3 is a schematic view of the cleaning of drive rollers.

The cleaning card according to the invention comprises a card body 10 similar, as far as its surface is concerned, to the card that the printer is supposed to print. This card body 10 may have a thickness smaller than the minimum thickness. In the case of bank cards, the card body 10 complies with the ISO standard 7816.2 and its thickness may be smaller than 0.680 mm. This card is coated with a first means for the cleaning of the various types of dust and dirt, this means being formed by at least one flat pad or cushion 11 (or 11A), one face of which is bonded to one face 21 (or 21A) of the card. The other face of the pad 11 (or 11A) is coated with a material 22 (or 22A) that is designed to collect and keep the dust and dirt. This material 22 (or 22A) may be an adhesive material to which the dust and dirt cling.

The pad 11 or 11A coats the entire card body 10 in its width but only a part of it in its length, especially when the card has an integrated circuit in a cavity so as to enable the positioning of a second means 12 for the cleaning of the electrical contacts which are designed to work together with the input/output terminals or contact blocks of the integrated circuit inside the card.

Figure 4:
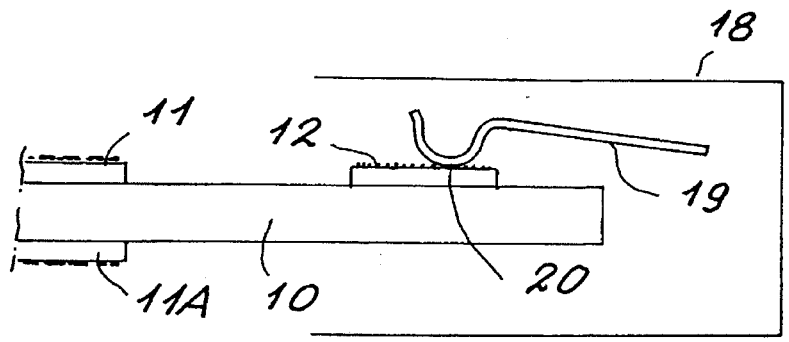
FIG. 4 is a schematic view of the cleaning of the landing contacts.

This second cleaning means comprises a pad 12, one face of which is bonded to the face 21, the one set aside for the cleaning of the input/output contact blocks of the integrated circuit. The other face of the pad 12 is coated with a material 23 which is designed to clean the electrical contacts 19 (FIG. 4). This material 23 is, for example, a very fine-grained abrasive paper. This second pad 12 is positioned at the location planned for the input/output contact blocks of the integrated circuit and has a surface area that is large enough to meet the electrical standards set, notably the ISO standard corresponding to the rectangle 14 and the AFNOR standard corresponding to the rectangle 13.

The thickness of the pad 12 and of the abrasive material 23 is smaller than that of the pad 11 plus the layer 22 so that it does not come into contact with the elements to be cleaned other than the electrical contacts. To clean the printing machine with which an electrical customization station is associated, the card is inserted into the feed system of the thermal transfer printing machine the conveying and electrical customization elements of which are to be cleaned. The cleaning takes place with the thermal printer head in a neutral position, i.e. corresponding to the shifting of the card beneath the thermal printer head or heads without contact with this head or heads.

When the cleaning card goes between external or internal conveyor rollers 15, 15A, in one direction or the other 16, 17, the pad 11, 11A, gets charged with dust and various deposits present on the surface of the rollers and keeps them in its adhesive structure. The cleaning card goes through the entire cycle or the cycle specific to each machine, including the card turn-over device if the machine is provided with one.

The cleaning card also penetrates the electrical customization device 18 of the cards and the landing contacts 19 gradually rub against the adhesive paper 12 to be rid of impurities and revive the electrical contacts 20.

The movement of the cleaning card body 10 in the printing machine and the electrical customizing station may take place in both directions but it is preferable that the direction should be such that the cleaning of the electrical contacts 19 should take place at the end, after they have been subjected to friction with the pad and not the reverse for, in the latter case, the contacts could again get soiled with the dirt collected by the pad 11.

To resolve this problem it is also possible to place the pad 12 at the other end of the card 10 in relation to the pad 11. In any case, it is also necessary to take account of the position of the electrical customization station with respect to the printing machine in the direction of movement of the cleaning card.

The specifications relating to the frequency of use of a cleaning card as well as the duration of the efficiency of said card depend on the different types of thermal transfer printing machines, notably the number of work stations, the quality of the cards and ribbons and the surrounding conditions of the work room as regards dust, temperature and hygrometry.

What is claimed is:

1. A cleaning card for cleaning elements of a thermal transfer card printing machine, the card printing machine including an electrical customization device having electrical landing contacts, the cleaning card comprising:

a card body having a face and a width, the width being substantially identical to a width of a card printed by the card printing machine, the width of the card body and the width of the printed card being transverse to a direction of movement through the card printing machine;

a first cleaning pad, the first cleaning pad being attached to the face of the card body, the first cleaning pad extending substantially the width of the card body, the first cleaning pad being spaced from a forwardmost edge of the card body and being spaced from a rearwardmost edge of the card body, and the first cleaning pad defining means for cleaning a roller of the card printing machine;

a second cleaning pad, the second cleaning pad being attached to the face of the card body and adjacent to the first cleaning pad, the second cleaning pad being spaced from a forwardmost edge of the card body and being spaced from a rearwardmost edge of the card body, and the second cleaning pad defining means for cleaning the electrical landing contacts of the electrical customization device.

2. A cleaning card according to claim 1, wherein the first cleaning pad is flat and has two faces, one of said two faces being attached to the card body, the other of said two faces being coated with an adhesive material.

3. A cleaning card according to claim 1, wherein the second cleaning pad is flat and has two faces, one of said two faces being attached to the card body, the other of said two faces being coated with an abrasive material.

4. A cleaning card according to claim 1, wherein a thickness of the second cleaning pad is smaller than a thickness of the first cleaning pad.

5. A cleaning card according to claim 1, wherein the first cleaning pad is disposed ahead of the second cleaning pad with respect to the direction of movement through the card printing machine, and wherein the roller of the card printing machine is disposed ahead of the electrical landing contacts of the electrical customization device with respect to the direction of movement of the cleaning card through the card printing machine.

6. A cleaning card according to claim 1, wherein the card body is rigid.

7. A cleaning card for cleaning elements of a thermal transfer card printing machine, the card printing machine including an electrical customization device having electrical landing contacts, the cleaning card comprising:

a rigid card body having a face and a width, the width being substantially identical to a width of a card printed by the card printing machine, the width of the card body and the width of the printed card being transverse to a direction of movement through the card printing machine;

a first cleaning pad, the first cleaning pad being attached to the face of the card body, the first cleaning extending substantially the width of the card body, the first cleaning pad being spaced from a forwardmost edge of the card body and being spaced from a rearwardmost edge of the card body, the first cleaning pad being flat and having two faces, one of said two faces being attached to the card body, the other of said two faces being coated with an adhesive material, and the first cleaning pad defining means for cleaning a roller of the card printing machine;

a second cleaning pad, the second cleaning pad being attached to the face of the card body and adjacent to the first cleaning pad, the second cleaning pad being spaced from a forwardmost edge of the card body and being spaced from a rearwardmost edge of the card body, the second cleaning pad being flat and having two faces, one of said two faces being attached to the card body, the other of said two faces being coated with an abrasive material, and the second cleaning pad defining means for cleaning the electrical landing contacts of the electrical customization device.

8. A cleaning card according to claim 7, wherein a thickness of the second cleaning pad is smaller than a thickness of the first cleaning pad.

9. A cleaning card according to claim 7, wherein the first cleaning pad is disposed ahead of the second cleaning pad with respect to the direction of movement of the cleaning card through the card printing machine, and wherein the roller of the card printing machine is disposed ahead of the electrical landing contacts of the electrical customization device with respect to the direction of movement of the cleaning card through the card printing machine.

10. A cleaning card according to claim 7, wherein a thickness of the card body is less than 0.680 mm.

11. A cleaning card according to claim 7, wherein the first cleaning pad extends the entire width of the cleaning card.

12. A method of cleaning a thermal transfer card printing machine having an electrical customization device, the method comprising the steps of:

providing a cleaning card having a first adhesive cleaning pad and a second abrasive cleaning pad, the first and second cleaning pads each being attached to a same face of the cleaning card, and the first and second cleaning pads each being spaced from a forwardmost edge of the card body and from a rearwardmost edge of the card body;

inserting the cleaning card into a feed system of the card printing machine;

conveying the cleaning card through the card printing machine, the conveying step being performed by the card printing machine;

cleaning a roller of the card printing machine with the first cleaning pad of the cleaning card; and immediately after performing the step of cleaning a roller of the printing card machine with the first cleaning pad of the cleaning card, cleaning electrical landing contacts of the electrical customization device with the second cleaning pad of the cleaning card.

13. A method according to claim 12, wherein the step of cleaning rollers further comprises the step of collecting deposits present on a surface of the roller with an adhesive face of the first cleaning pad.

14. A method according to claim 12, wherein the step of cleaning landing contacts comprises the step of freeing the electrical landing contacts of impurities with an abrasive face of the second cleaning pad.

* * * * *